(No Model.)
R. FORWOOD.
SPIRIT LEVEL.
No. 456,086. Patented July 14, 1891.
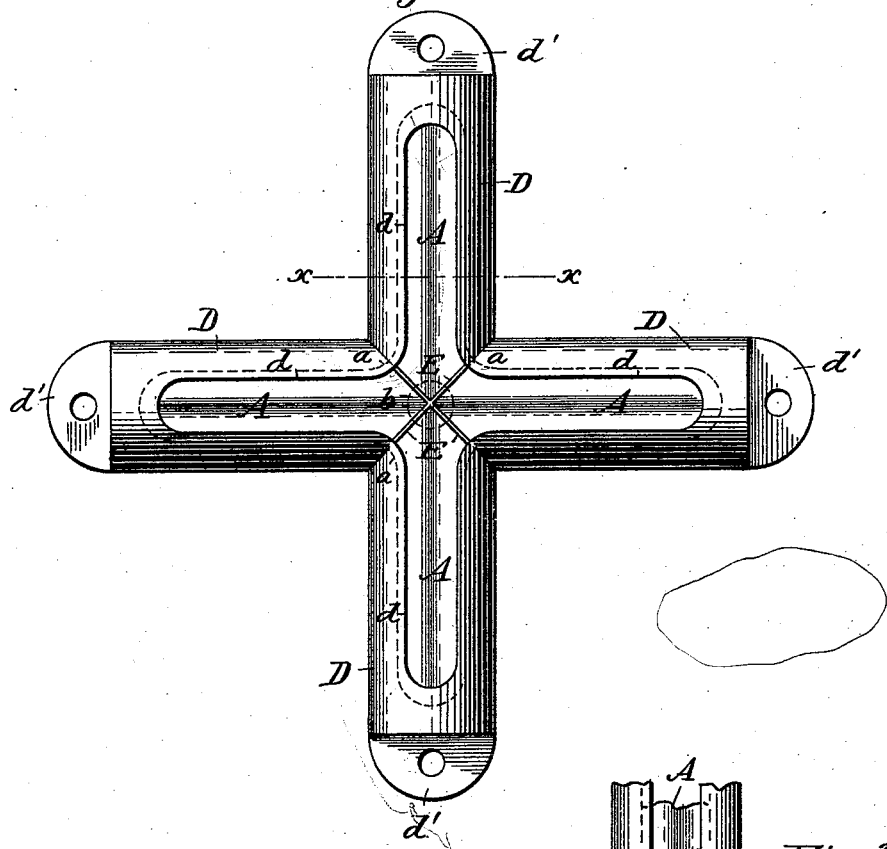
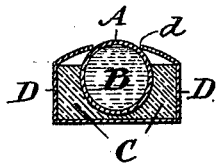
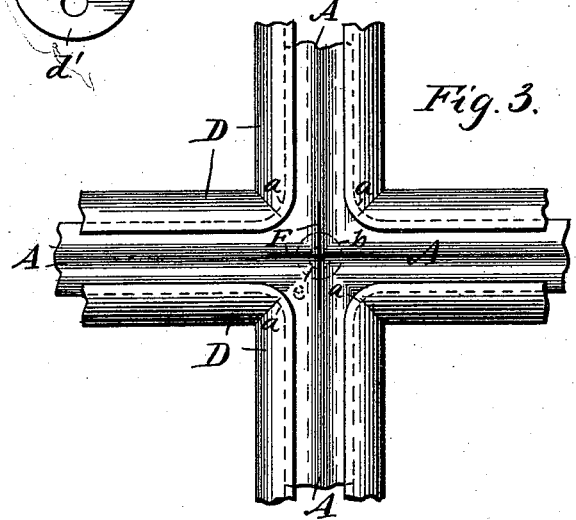
WITNESSES:
J. Henry Thiberath
C. Sedgwick
INVENTOR:
R. Forwood
BY Munn & Co.
ATTORNEYS

UNITED STATES PATENT OFFICE.

REGINALD FORWOOD, OF NEW YORK, N. Y.

SPIRIT-LEVEL.

SPECIFICATION forming part of Letters Patent No. 456,086, dated July 14, 1891.

Application filed August 11, 1890. Serial No. 361,704. (No model.)

*To all whom it may concern:*

Be it known that I, REGINALD FORWOOD, a subject of the Queen of Great Britain, at present residing in the city, county, and State of New York, have invented a new and Improved Universal Spirit-Level, of which the following is a full, clear, and exact description.

My invention has for its object to provide a simple, compact, and efficient universal spirit-level by which the true level both ways of a photographic camera or other object may be quickly and conveniently ascertained.

The invention consists in certain novel features of construction and combinations of parts of the spirit-level, all as hereinafter described and claimed.

Reference is to be had to the accompanying drawings, forming a part of this specification, in which similar letters of reference indicate corresponding parts in all the figures.

Figure 1 is a plan view of a spirit-level made in accordance with my invention. Fig. 2 is a detail transverse section of one arm of the level, taken on the line $xx$ in Fig. 1. Fig. 3 is a detail central plan view illustrating a modification of the invention.

This spirit-level is made in four-arm or cruciform shape and comprises a cruciform or four-armed glass A, nearly filled with spirits or other suitable fluid B, which produces the usual air-bubble $b$ for indicating a true level. The glass is properly held by a bed C, of plaster, or in other suitable manner, within a four-armed casing D, cut away at the top to provide a cruciform slot or opening $d$, through which the air-bubble $b$ is clearly visible. The casing preferably has four end flanges $d'$, provided with holes through which screws or nails may be passed to fasten the level to a camera-box or other object to be leveled by it.

Figs. 1 and 2 of the drawings show that at the points of intersection of the four arms of the spirit-glass A the latter is rounded, as indicated by the dotted lines $a\ a\ a\ a$, to avoid sharp corners and allow free passage of the air-bubble $b$ from one arm of the glass to any other arm thereof while determining the true level of the box or object to which the level is fastened or upon which it may be placed.

By thus avoiding sharp corners of the glass at the points of intersection of its arms the bubble meets little or no obstruction in passing from one arm of the glass to the other, and the constant sensitiveness of the level is assured. The true level in every direction of a camera-box or other object to which this four-armed-level device is applied will be indicated by the presence of the air-bubble $b$ directly at the center of the glass A or at a point equidistant from the four rounded corners $a$ of the glass.

To avoid errors and secure true leveling of the object, I provide an indicator over or at the center of the glass. This indicator may consist of a couple of intersecting metallic bars or wires E E or equivalent threads extending across the center of the opening $d$ of the casing D and either stamped out of the metal forming the casing or soldered or otherwise fastened thereto, as shown in Fig. 1 of the drawings; or the indicator may consist of two crossing marks or lines F, made directly upon the center of the spirit-glass A, as shown in Fig. 3 of the drawings.

The true-level indicator is not necessarily two or more crossed bars or wires on the casing or two crossed marks on the spirit-glass, as it may consist of a single ring or mark $e$, placed at the center of the spirit-glass, as shown by the dotted lines in Fig. 3 of the drawings.

Having thus described my invention, what I claim as new, and desire to secure by Letters Patent, is—

1. A universal spirit-level made with a four-armed or cruciform spirit-glass, substantially as described.

2. A universal spirit-level made with a casing, and a four-armed or cruciform spirit-glass secured therein, substantially as described.

3. A universal spirit-level made with a four-armed or cruciform casing, and a four-armed or cruciform spirit-glass secured therein, substantially as described.

4. A universal spirit-level made with a four-armed or cruciform spirit-glass having rounded corners or portions at the points of intersection of the arms, substantially as described.

5. A universal spirit-level made with a four-armed or cruciform spirit-glass, and a true-level indicator at the center of said glass, substantially as described.

6. A universal spirit-level made with a four-armed spirit-glass, and a true-level indicator at the center of said glass and consisting of crossed bars or marks, substantially as described.

7. The combination, in a spirit-level, of a four-armed casing having a cruciform slot $d$, and a four-armed or cruciform spirit-glass held in said casing and provided with rounded corners $a$ at the points of intersection of its arms, substantially as described.

8. The combination, in a spirit-level, of a four-armed casing having a cruciform slot $d$, and a four-armed or cruciform spirit-glass held in said casing and provided with rounded corners $a$ at the points of intersection of its arms, said casing provided with true-level indicators E E above the center of the glass, substantially as described.

REGINALD FORWOOD.

Witnesses:
HENRY L. GOODWIN,
EDGAR TATE.